Sept. 5, 1939.    O. RALL    2,171,991

FILM-WINDING AND FILM-STORING MEANS FOR COILED FILMS

Original Filed Dec. 18, 1935    2 Sheets-Sheet 1

Inventor:
Ottmar Rall
by S. Sokal.
Attorney.

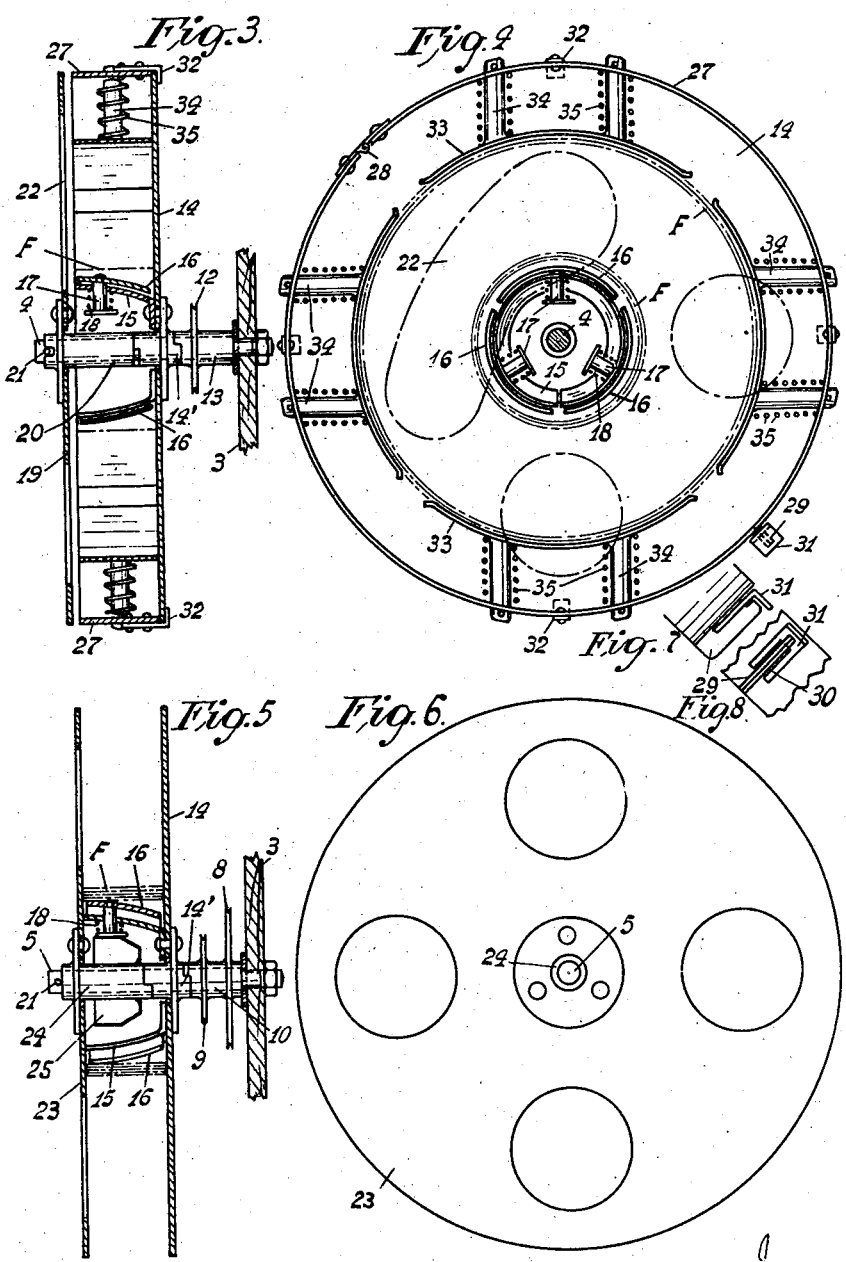

Patented Sept. 5, 1939

2,171,991

UNITED STATES PATENT OFFICE 2,171,991

FILM-WINDING AND FILM-STORING MEANS FOR COILED FILMS

Ottmar Rall, Zurich, Switzerland

Application December 18, 1935, Serial No. 55,119.
Renewed February 9, 1939. In Germany December 18, 1934

5 Claims. (Cl. 88—13.7)

The present invention relates to improvements in film winding and film storing means for coiled films of kinematograph apparatus. In order to avoid re-winding of the film during projection, it has been proposed to take the film from an inner point of the pay-out spool and wind some outwardly upon the take-up spool. It has also been proposed in conjunction with this mode of winding the film, to make the pay-out and the take-up spools exchangeable and connect the two spools during projection by a belt or like drive.

The present invention has for its object to improve an arrangement of this kind so as to attain a smooth, jerk-free removal of the film from the pay-out spool and also a smooth winding upon the take-up spool. Both spools are operatively connected so that the film is positively pulled out of the pay-out spool. The pay-out spool is, in known manner, provided with a ring holding the film from the outside.

By the improved arrangement according to the invention the wearisome re-winding of the film during projection is entirely avoided and correct feeding of the film through the projection apparatus is insured. The film is passed in a perfectly smooth and jerk-free manner from the pay-out spool to the take-up spool, being fully protected against damage, whereby its life is prolonged.

The improved spools according to the invention are extremely simple and cheap to manufacture, and can therefore be used also as storage spools for storing a considerable number of films.

The accompanying drawings show by way of example one construction embodying the features of the invention.

Fig. 3 is a cross section of the pay-out spool,

Fig. 4 is a corresponding sectional elevational view of the said pay-out spool,

Fig. 5 is a cross section of the take-up spool,

Fig. 6 is an elevation corresponding to Fig. 5, and

Figs. 7 and 8 are front and side views respectively of a detail appertaining to the pay-out spool.

Figure 1:
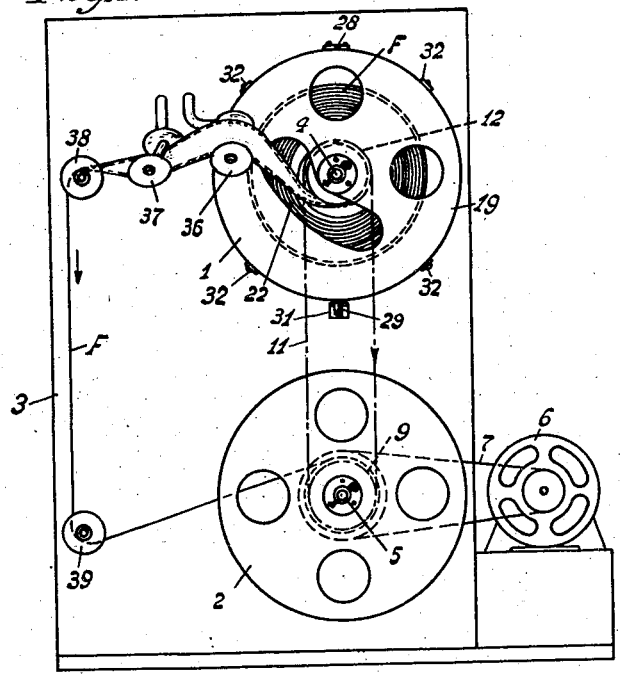
Fig. 1 shows the arrangement of the two spools, namely, the pay-out and the take-up spools in the projection apparatus, in elevational view.
Figure 2:
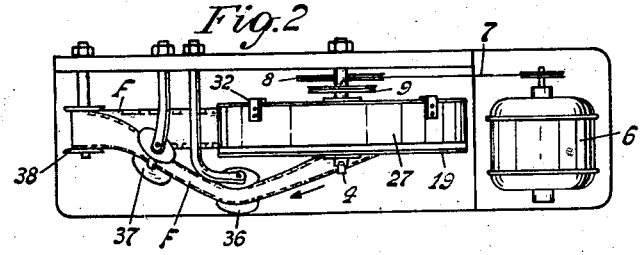
Fig. 2 is a plan view corresponding to Fig. 1.

The complete film-winding arrangement comprises two spools 1 and 2 which are mounted in a casing 3 upon shafts 4 and 5. The two spools are driven by means of an electro-motor 6, via cord pulleys 8, 9 and 12 and cords 7 and 11. The cord pulleys are loosely mounted by means of sleeves 10 and 13 upon the shafts 4 and 5 and are in driving engagement through the medium of claws with corresponding parts 14' of the spools.

The spools each consist of a lateral flange 14 fixedly connected with the corresponding sleeve 14'. Upon the lateral flange 14 is fixed a spool core 15 provided with jaws 16 which are yieldingly mounted to move in the radial direction. The yielding mounting of the jaws may be obtained in various ways, for instance, as shown in the drawings by means of bolts 17 loaded by springs 18. Preferably, the spool core and the jaws 16 mounted thereon are so constructed that they taper towards the fixed lateral flange 14 as shown in Figs. 3 and 5. This tapering has the result that the film on being removed, does not slide with its inner edge upon the spool core. This sliding of the edge usually leads to damage. In connection with the take-up spool the tapering of the spool core has the result that the windings or coils of the film bear against the lateral flange 14 so that after removal of the covering plate 23, the film lies firmly upon the lateral flange 14 and can be removed with the latter.

In the pay-out spool, as shown in Fig. 3, the covering plate is mounted upon a sleeve 20 adapted to be slid upon the shaft 4 and locked by means of a pin 21 against rotation. The covering plate has a kidney-shaped opening 22, as shown in Fig. 1, through which the film is removed from the interior of the coiled film.

As shown in Fig. 4, the spool is covered by means of an annular band 27, which consists of two halves connected by a hinge 28, and fastened, as shown in Figs. 7 and 8 by a fastening comprising a slot 30 and a fastening member proper 31. The band 27 is provided with tongues 32 which engage the lateral flange 14 and thereby hold the band 27 upon the periphery of the spool. The band 27 is provided with arcuate jaws 33, which are resiliently pressed against the film coil by means of springs 35 mounted upon guide bolts 34 fixed to the jaws.

The covering plate 23 of the take-up spool (Fig. 5) is mounted upon a sleeve 24 provided with claws engaging the sleeve 14'. Upon the sleeve 24 is mounted a cam member 25 which upon insertion of the sleeve 24 acts upon the bolts 17 of the jaws 16 to force the jaws outwardly.

As may be seen from Figs. 3 and 4, the jaws 16 of the pay-out spool are pulled inwards by the springs 18 so that the film can be removed, free from friction, through the opening 22 of the pay-out spool. The film is then passed over guide rollers 36, 37, 38, 39 to the take-up spool 2. As shown in Fig. 5, the core of the take-up spool 2 is adjusted by the movable jaws 16 to the same diameter as the first coils of the coiled film of the pay-out spool. The two spools can therefore be connected together as shown in Fig. 1 by a cord drive so that the film is moved without any jerks and perfectly smoothly from the pay-out spool and wound with exactly the same speed upon the take-up spool.

When the film has passed through the projector and been fully wound upon the take-up spool, and it is desired to use the film again for projection, the two spools are after removal of the covering plates 19 and 23 exchanged, the band 27 is placed upon the pay-out spool, and the film is again passed through the projector without re-winding, by taking the inner end of the film from the pay-out spool and winding th film upon the take-up spool.

This arrangement is suitable for practically all film projectors, and can be used also for narrow films. The spools are very cheap to manufacture and can therefore be used as ordinary store spools.

I claim:

1. In a film spool the sub-combination of: a fixed lateral flange; a core fixed to said flange and tapering towards said flange; jaws likewise tapering towards said flange and mounted upon said core to move radially with regard to the centre of the spool; spring means tending to move said jaws inwardly, said spring means comprising bolts fixed to the jaws and springs acting upon said bolts; a removable cover provided with an internal sleeve; cam means mounted upon said internal sleeve adapted to co-operate with the inner ends of said bolts to move said jaws outwardly upon insertion of said cover.

2. In a film spool for kinematographic projectors, the sub-combination of: a fixed lateral flange; a core fixed to said fixed flange; spring means tending to collapse said core radially; means for expanding said core, and an outer covering ring clamped to said lateral flange and adapted to hold the coiled film at the periphery said outer ring consisting of two halves hingedly connected together and adapted to be fastened together, and spring-actuated jaws mounted in said ring adapted to act upon the periphery of the film.

3. In a film spool, the sub-combination of: a fixed lateral flange; a radially collapsible film supporting core mounted upon said fixed lateral flange; and a device for holding the coiled film upon its periphery, said device comprising a ring clamped to said lateral flange and consisting of two halves hinged together; means for fastening the two open ends of said halves; and spring-actuated jaws mounted upon said ring halves.

4. In film spools a pay-out spool and a take-up spool interchangeable with said pay-out spool, each comprising in sub-combination: a fixed lateral flange; an inwardly tapered core fixed to said flange; inwardly tapered jaws mounted resiliently on said core; means for positively rotating said core around a horizontal axis; means for moving said jaws towards and away from the axis of said core; a removable cover provided with an internal sleeve; and an outer two-part hinged covering ring associated with said flange for holding the coiled film at the periphery.

5. In film spools a pay-out spool and a take-up spool interchangeable with said pay-out spool, each comprising in sub-combination: a fixed lateral flange; an inwardly tapered core fixed to said flange; inwardly tapered jaws mounted resiliently on said core; means for positively rotating said core around a horizontal axis; means for moving said jaws towards and away from the axis of said core; a removable cover provided with an internal sleeve; an outer two-part hinged covering ring associated with said flange for holding the coiled film at the periphery; and spring-actuated jaws mounted in said ring adapted to act upon the periphery of the film.

OTTMAR RALL.